US006760276B1

(12) United States Patent
Karr

(10) Patent No.: US 6,760,276 B1
(45) Date of Patent: Jul. 6, 2004

(54) ACOUSTIC SIGNALING SYSTEM

(76) Inventor: Gerald S. Karr, 10410 Palms Blvd., Los Angeles, CA (US) 90034

( * ) Notice: Subject to any disclaimer, the term of this patent is extended or adjusted under 35 U.S.C. 154(b) by 0 days.

(21) Appl. No.: 09/503,615

(22) Filed: Feb. 11, 2000

(51) Int. Cl.[7] ........................... G08B 25/08; B64F 1/18; G08G 5/00; G10K 11/00; G10L 19/14

(52) U.S. Cl. .................. 367/197; 340/952; 340/825.69; 340/692; 704/205; 704/206

(58) Field of Search .......................... 341/176; 348/734, 348/769; 345/158; 375/219, 287, 295, 316, 318; 704/205, 206, 210, 220, 224, 229, 240, 265, 216; 367/197, 198, 199; 340/952, 692

(56) References Cited

U.S. PATENT DOCUMENTS

| | | | | | |
|---|---|---|---|---|---|
| 4,039,754 | A | * | 8/1977 | Lokerson | 179/1 |
| 4,165,581 | A | * | 8/1979 | Wolf | 446/175 |
| 4,840,602 | A | * | 6/1989 | Rose | 446/175 |
| 4,923,428 | A | * | 5/1990 | Curran | 446/175 |
| 5,009,147 | A | * | 4/1991 | Yamamori | 84/618 |
| 5,717,656 | A | * | 2/1998 | Dourbal | 367/128 |
| 5,764,763 | A | * | 6/1998 | Jensen et al. | 380/6 |
| 5,878,394 | A | * | 3/1999 | Muhling | 704/275 |
| 6,022,273 | A | * | 2/2000 | Gabai et al. | 463/39 |
| RE36,721 | E | * | 5/2000 | Akamine et al. | 704/220 |
| 6,108,271 | A | * | 8/2000 | Junkin | 367/127 |
| 6,330,533 | B2 | * | 12/2001 | Su et al. | 704/220 |
| 6,429,846 | B2 | * | 8/2002 | Rosenberg et al. | 345/156 |

* cited by examiner

*Primary Examiner*—Michael Horabik
*Assistant Examiner*—Nam Nguyen
(74) *Attorney, Agent, or Firm*—Richard A. Joel, Esq.

(57) ABSTRACT

An acoustic signaling system comprises a transmitter, which has frequency stability to create sounds which can reliably be received and which is loud enough to be heard by a receiver. The receiver includes an electret microphone, a limiting amplifier which has high gain, high frequency roll off and produces a maximum output for any input above a minimum value and a Schmitt trigger circuit to square up the output of the limiting amplifier and function as a zero cross detector. A micro-controller measures the times of the zero crossings and performs the detection and decoding algorithms to determine what code is being received. Each code consists of an anonymous repeating sequence of tones, which are transmitted for a certain duration followed by a silence, which allows room echoes to decay. The system creates acoustic sound codes, which are pleasant, sounding, can reliably be received and convey sufficient information to activate toys or dolls.

26 Claims, 6 Drawing Sheets

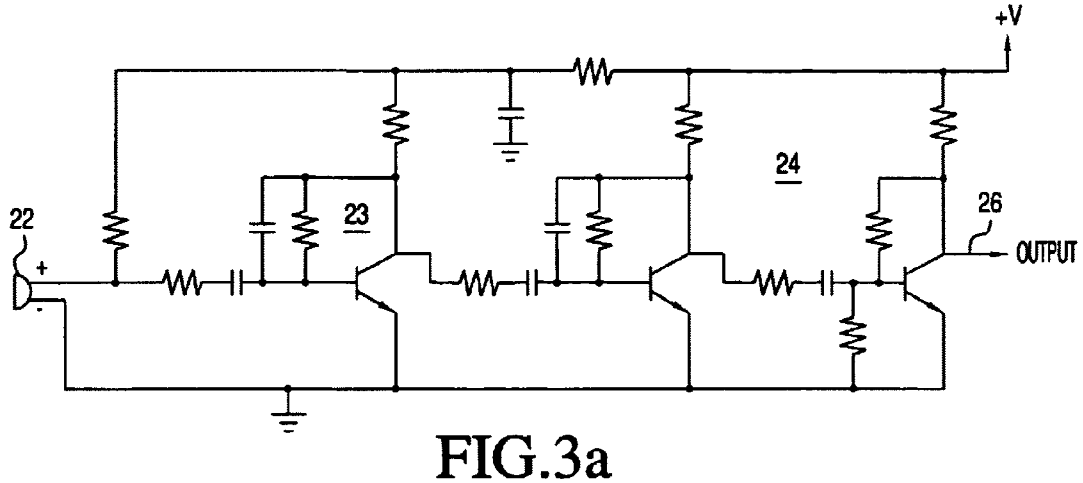
FIG.3a
FIG.3b
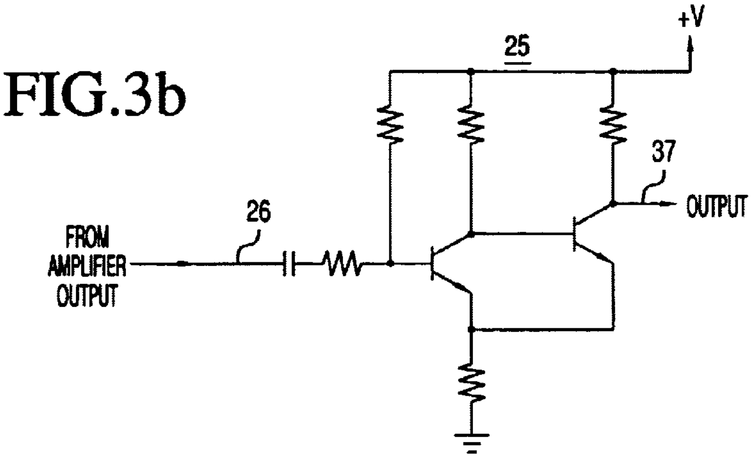
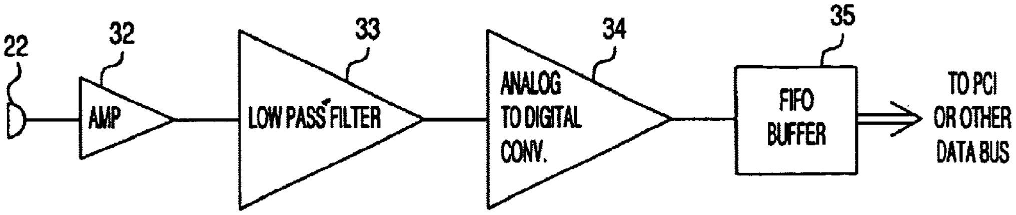
FIG.3c

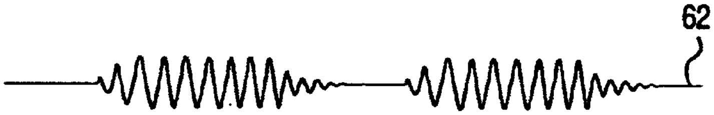
FIG.8a
FIG.8b
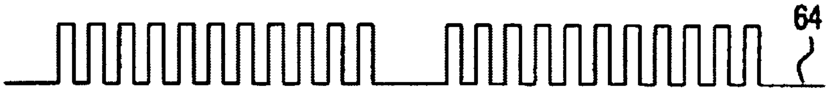
FIG.8c
FIG.9a
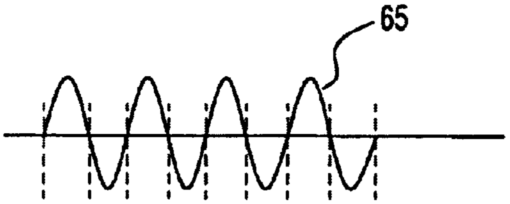
FIG.9b
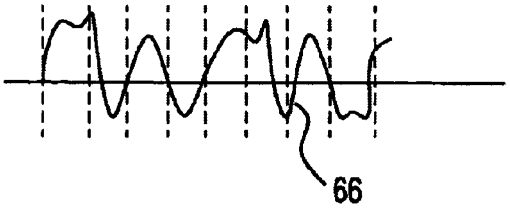
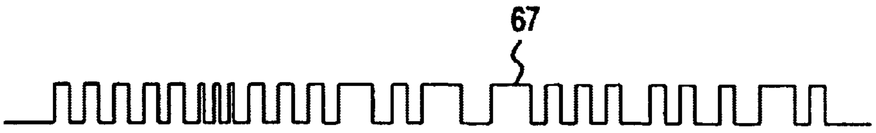
FIG.10

ACOUSTIC SIGNALING SYSTEM

CROSS-REFERENCE TO RELATED APPLICATIONS

Not applicable.

STATEMENT REGARDING FEDERALLY SPONSORED RESEARCH OR DEVELOPMENT

Research and development of the present invention and application have not been Federally sponsored, and no rights are given under any Federal program.

BACKGROUND OF THE INVENTION

1. Field of the Invention

This invention relates to an acoustic signaling system involving acoustic sound codes that are pleasant sounding and convey information which can be received reliably in the presence of normal room echo and ambient noise. In a preferred embodiment, the code signals a doll to act in a predetermined manner such as crying, sleeping, laughing, etc. The system uses short bursts of sound separated by gaps to overcome the echo problem and can be incorporated in almost any electronic product allowing the product to receive commands from broadcast material. The system may be incorporated in a virtual pet, an automated exercise machine or games or may be adapted to make various products such as VCR's interactive.

2. Description of the Related Art Including Information Disclosed UNER 37 CFR §§1.97–1.98

This invention relates to an acoustic signaling system involving acoustic sound codes that arm pleasant sounding and conveys information which can be received reliably in the presence of normal room echo and ambient noise. In a preferred embodiment, the code signals a doll to act in a predetermined manner such as crying, sleeping, laughing, etc. The system uses short bursts of sound separated by gaps to overcome the echo problem and can be incorporated in almost any electronic product allowing the product to receive commands from broadcast material. The system may be incorporated in a virtual pet, an automated exercise machine or games or may be adapted to make various products such as (VCRs) interactive.

It is also a requirement of the present invention that the codes be reliably received as described above using inexpensive electronics in both the transmitter and receiver. The present system is economical today, and works well, and further, the codes will be even more reliably received using tomorrow's technology.

The present invention has the further advantage that the transmitted sound codes are audible but not decipherable to the average listener. We refer to this quality as anonymity. Another advantage of the present invention is that in an implementation using an existing product such as a television as the transmitter of the sound codes said product does not require any modification or outboard circuitry to be connected to it.

The prior art includes acoustic data transmission systems of the following types:

1. An acoustic coupler as used with a modem, couples closely with a telephone handset, using a rubber shroud to increase the coupling and block out extraneous sounds. This system will provide a good data rate of up to 1200 baud or even higher, but will not work if the elements are separated by more than a fraction of an inch. If an attempt is made to increase the operating distance by increasing the loudness of the transmitting elements and increasing the sensitivity of the receiving elements, the system will not work due to increased group delay distortion, echo, mixture with ambient sound, and room echo and cancellations.
2. A sending device producing a whistle-like sound may be used to trigger a response in a receiving device. A PC can generate such a sound, which would be, more or less, a continuous tone. To aid in noise rejection, the tone could be made to last for a specific length of time, such as one second. Then, different frequencies might be used to trigger different specific responses in the receiver. A few of the problems that such a system will suffer from are false triggers from voice or musical sounds in the vicinity, difficulty in reception of certain frequencies due to mom cancellations and reflections, the annoying nature of such long steady sounds to the listener, difficulty in designing receiver electronics with adequate dynamic range at reasonable cost, poor reception due to uncertainty in the receiver over whether or not the signal is the correct one out of the many sounds floating in the air, and lack of anonymity.

In any real-world situation, sound waves will spread out from the source until they hit obstacles, then reflect and, if not absorbed, continue traveling in a new direction according to all the well known wave propagation laws. Any effective communication system will have to deal with these echoes.

It is theoretically possible to compensate digitally for room echoes, if: a) enough digital processing power is available, and b) if the A/D) converter in a reception system has sufficient accuracy (dynamic range and high signal/noise ratio). The difficulty of digitally compensating for echoes is exacerbated if the receiving or transmitting device is moving within the room, as the echo trajectories must be continuously recalculated. In such a case digital removal of echoes may be, for practical purposes, not possible. The present invention attacks the echo problem by designing the transmitted tones to have a high degree of immunity to the echo problem. Basically, there are no appropriate acoustic signaling systems in the prior art, which involve applicant's unique features.

SUMMARY OF THE INVENTION

This invention relates to acoustic signaling systems and particularly to a system utilizing a transmitter to provide a predetermined acoustic code to a receiver to control the action of the device incorporating or controlled by the receiver. The transmitter is an electronic device, which creates acoustic signaling sounds in its internal software or plays back a previously created recording of the signaling sounds. In a preferred embodiment, the transmitter is a PC or Mac and a doll comes with a CD-ROM programmed to produce these codes through the computer's speaker at appropriate times.

The receiver comprises an electret microphone and a limiting amplifier, which has high gain and limits or produces a maximum output for any input signal above a minimum value. The amplifier also has a high frequency roll-off to eliminate high ultrasonic frequencies from the amplifier.

A Schmitt trigger circuit "squares up" the output of the limiting amplifier and functions as a zero cross detector producing a square wave that is "high" if the input waveform is positive and "low" if the input waveform is negative.

A micro-controller is used to measure the times of the zero crossings and determine what code is being listened to by the receiver. The micro-controller also controls all of the functions of the doll in the preferred embodiment, which includes controlling the motors and generating speech.

Each code consists of a repeating series of tones, which are each transmitted for a certain duration followed by a silence. The transmission gap allows room echoes to decay naturally. The burst nature of the sound allows it to penetrate where longer tones would otherwise be eaten up by reflections and standing waves.

A subset of the available codes has the characteristic that each code in the subset, in comparison to the other codes in the subject, is unidentifiable to the above human listener. These codes area referred to as the so-called "Anonymous Codes." A communication system can be designed in such a way that the Anonymous codes are used in places where their characteristic is desirable or necessary.

The present invention can be included in virtually any electronic products or added to a product to make it electronic in order to enable the product to receive commands from broadcast material. The broadcast material may be in the form of radio, television, Internet, VCR, DVD cassette players, etc. The claimed technology can also be adapted to make various products interactive and broadcast television could download program information regarding subject matter, start times, etc., to a product through the use of the present invention if incorporated into a remote control unit for the TV or other media device.

Accordingly, an object of this invention is to provide a new and improved acoustic signaling system.

Another object of this invention is to provide a new and improved acoustic signaling system, which is reliable and inexpensive.

Another object of this invention is to provide a new and improved acoustic signaling system using anonymous sounding codes which the average human listener can hear because they are acoustic but cannot identify.

A further object of this invention is to provide a new and improved acoustic signaling system which produces acoustic sound codes involving short bursts of sound separated by gaps to permit room echoes to decay and to permit the sound to penetrate where longer tones would be eaten up by reflections and standing waves.

A still further object of this invention is to provide a new and improved acoustic signaling system which includes a computer transmitter which sends preselected sound codes in bursts to a receiver which includes an electret microphone, a limiting amplifier, a Schmitt trigger circuit functioning as a zero cross detector and a micro-controller to determine what code is being transmitted and effectuate control operations on a toy embodying the receiver.

A more specific object of this invention is to provide a new and improved acoustic signaling system is to provide an inexpensive yet effective transmitting and a receiving system responsive to short bursts of selected acoustic signals each followed by silence, generated by a computer, to control the functioning of a doll through a receiver with responses to various codes generated by the transmitter.

Another object of this invention is to provide a new and improved wide range receiver mode possible by design of the tones and codes and exploited to the maximum inexpensive embodiment.

BRIEF DESCRIPTION OF THE DRAWINGS

The above and other objects and advantages of this invention may be more clearly seen when viewed in conjunction with the accompanying drawings wherein:

FIG. 3*a* is a circuit diagram of a receiver used in the preferred embodiment;

FIG. 3*b* is a Schmitt trigger circuit used in the preferred embodiment if the micro-controller does not have a Schmitt trigger built into its input port;

FIG. 3*c* is a block diagram of a PC sound card or sound circuitry involving a PC being used as a receiver;

FIGS. 6*a*–6*b* represent received waveforms with:

FIG. 6*a* as received in an anechoic chamber in the presence of a small amount of room echo (reverberation); and FIG. 6*b* as received in presence of a larger amount of reverberation, FIGS. 7*a*–7*b* illustrate waveforms if no gap is included in the transmitted signal (prior art) with:

FIG. 7*a* showing a transmitted waveform of two different tones; and,

FIG. 7*b* showing received waveforms with overlapping tones;

FIG. 8 shows transmitted and received waveforms in a "quiet room" with a small amount of echo and no noise;

FIG. 9 shows an example of the effect of noise on the receiver input waveform; and, FIG. 10 shows output of the Schmitt trigger in a noisy room with echo and ambient sounds such as music or TV.

DETAILED DESCRIPTION OF THE INVENTION

Figure 1A:
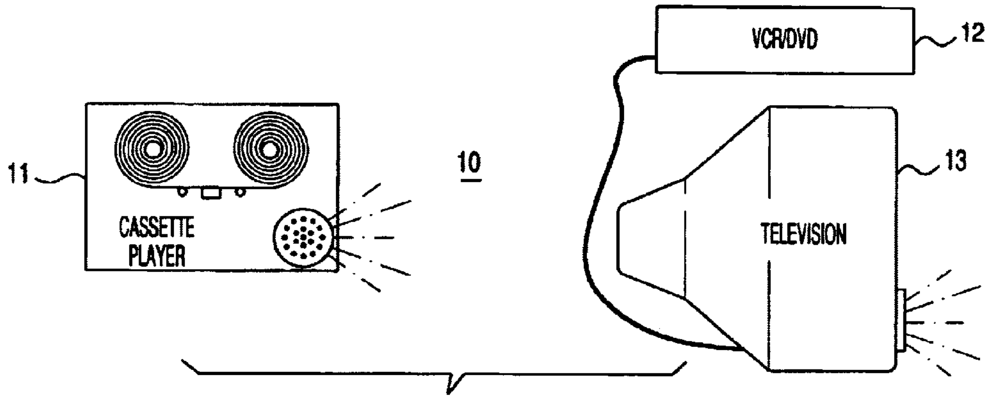
FIG. 1*a* depicts a cassette player/VCR used as a sound transmitter in the invention.

Referring now to the drawings, the invention comprises an acoustic signaling system for initiating control operations of various types. The system includes a transmitter 10 such as a computer or broadcast station and a receiver 20, which includes a micro-controller 30 responsive to coded sound bursts 55*a*–*c* from the transmitter 10 interrupted by gaps 56*a*–*c* to permit decay of echoes.

The transmitter 10 is shown in FIG. 1*a* as a cassette player 11 for use in the VCR/DVD 12, which is coupled to a television 13 to transmit signals.

Figure 1B:
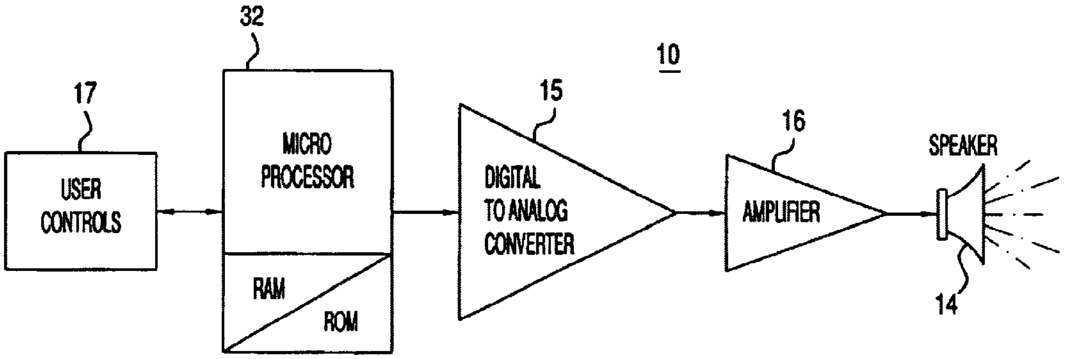
FIG. 1*b* depicts a microprocessor utilized as a sound transmitter.

FIG. 1*b* depicts a transmitter 10 comprising a microprocessor or PC 32 for generating preset or dynamically randomized and/or customized codes. The microprocessor 32 could be in a toy. The code is sent from a speaker 14 after the signal from the microprocessor 32 is fed to a digital to analog converter 15 and then through an amplifier 16. User controls are indicated at 17.

This embodiment involves generating dynamically preset or randomized and/or customized codes with a microprocessor 32 which could be in toy, or PC and sent out from a speaker. Preset means involve playing a WAV file or equivalent; randomized means starting and ending a code sequence on a random tone to achieve maximum anonymity; and customized means tailoring the total length of the transmitted sequence according to priority. If the transmission is sent longer it will eventually be heard, no matter what. This is rather different from simply repeating the sequence, because the repetition factor does not need to be an integer multiple of the inherent code length.

Figure 1C:
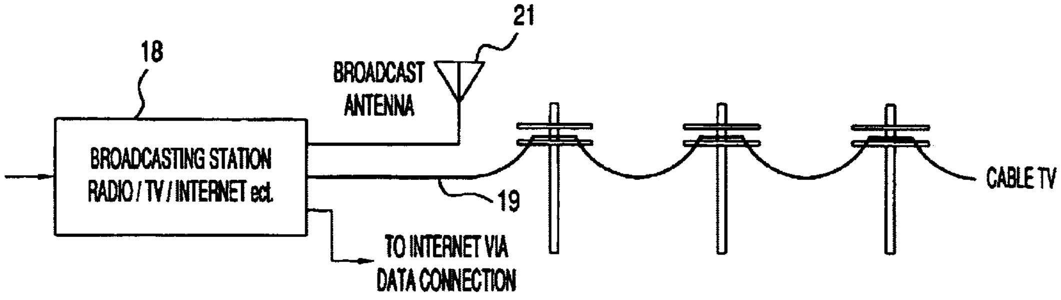
FIG. 1*c* depicts sending or broadcasting signals generated by the microprocessor of FIG. 1*b* by radio/TV/internet.

FIG. 1*c* depicts a broadcast station 18 sending a signal via cable 19, radio or TV through antenna 21 or via the Internet. The signal would be generated by microprocessor 31 of FIG. 1*b*.

Figure 2A:
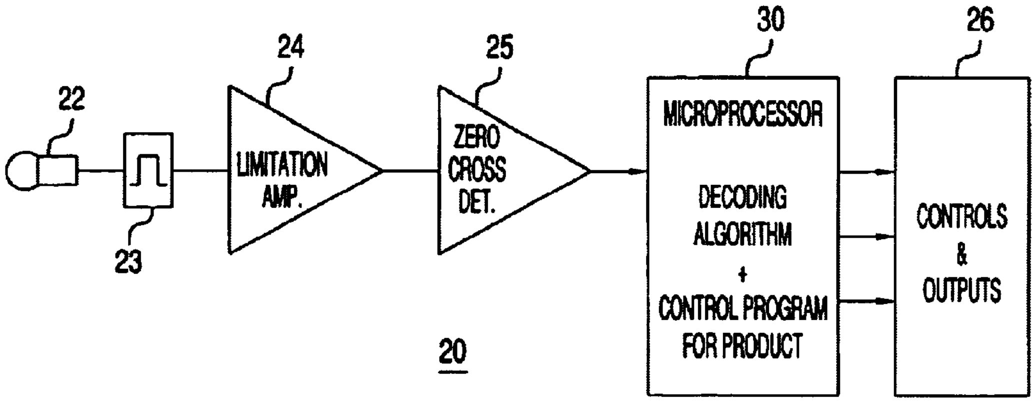
FIG. 2*a* depicts a preferred embodiment of the receiver utilized in conjunction with the transmitters of FIGS. 1*a*–1*c;*

FIG. 2*a* illustrates a preferred embodiment of the receiver 20, which is simple, inexpensive, and works well. The electret microphone 22 feeds the transmitted signal through a high frequency roll off/low frequency roll off 23 to a limiting amplifier 24 and then through a zero cross detector 25 to the microprocessor 30 which includes a decoding algorithm and a control program for the particular product. The output controls are shown at 26.

Figure 2B:
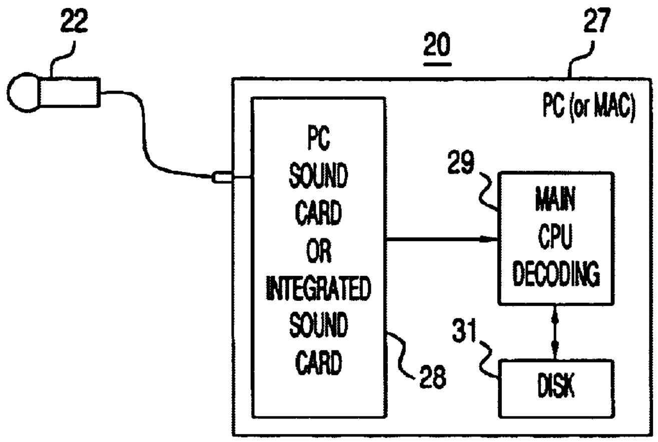
FIG. 2*b* illustrates a PC embodiment of a receiver.

FIG. 2*b* discloses a PC implementation of the receiver 20 with the PC or Mac 27 including a PC sound card 28 and the main CPU 29 for decoding. The program permitting the CPU to perform the necessary algorithm is loaded from the disk 31.

Figure 2C:
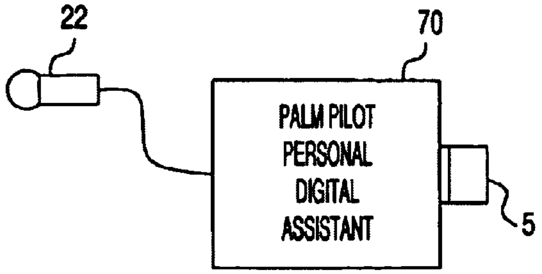
FIG. 2*c* illustrates a Palm Pilot™ functioning as a receiver.

FIG. 2*c* depicts a Palm Pilot™ 70 functioning in lieu of the PC 27 with a custom software card 71 or software download to perform the necessary algorithm.

As an option, the two systems shown in FIGS. 2*b* and 2*c* may act both as a sender and receiver i.e. a transceiver.

FIG. 3*a* is a schematic circuit diagram of the amplifier 24 with high frequency and low frequency roll off 23.

FIG. 3*b* is a schematic circuit diagram of the Schmitt trigger circuit 25 showing the input 26 from the amplifier 24 and the output 37 from the trigger circuit 25.

FIG. 3*c* depicts a PC implementation of the receiver 20. The circuitry involving amplifier 32, filter 33 converter 34 and buffer 35 is already present in the computer 27 or on a sound card.

Figure 4:
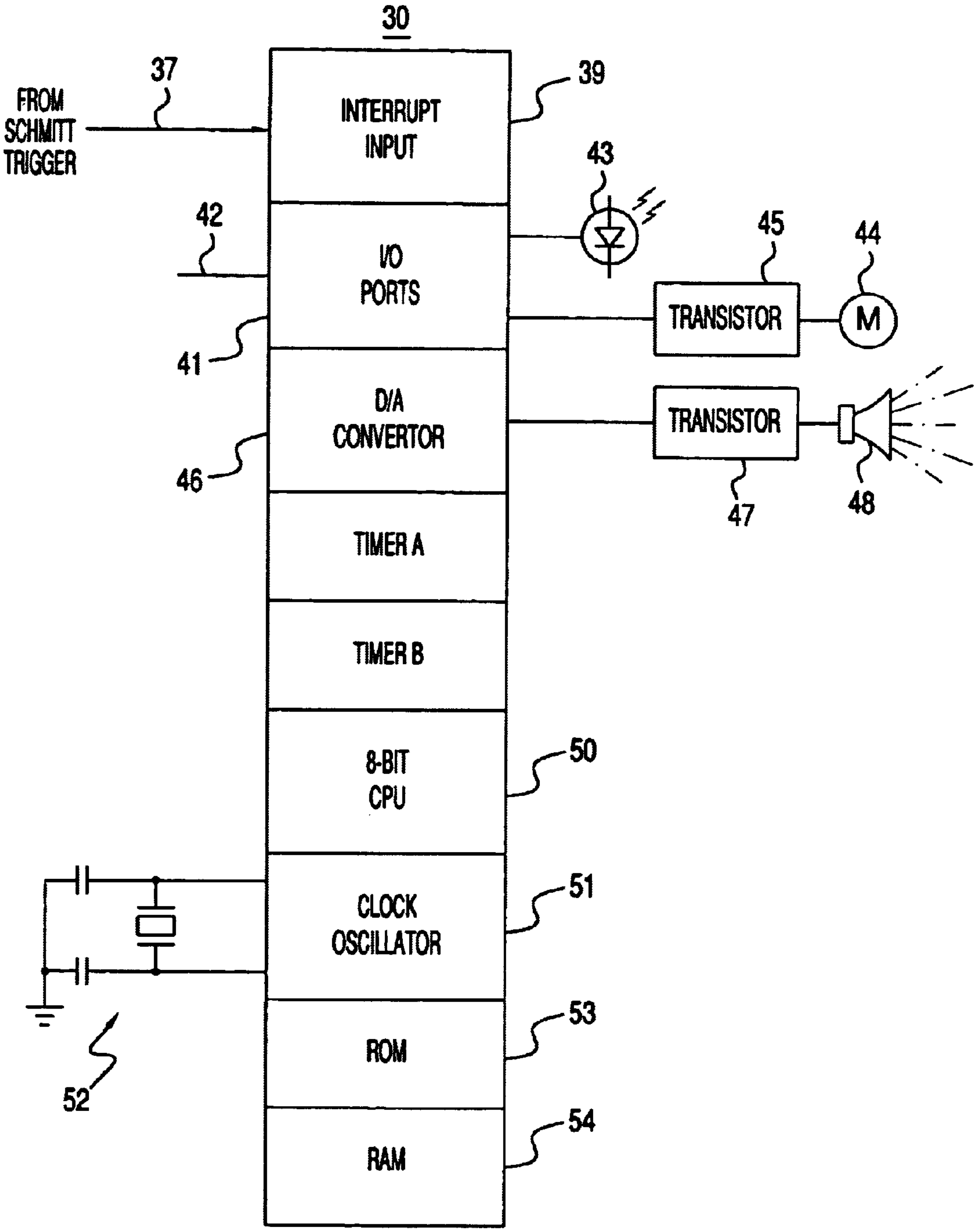
FIG. 4 is a block diagram of the micro-controller used in the preferred embodiment showing the major connections.

FIG. 4 is a block diagram of the micro-controller 30 used in the preferred embodiment. The input from the Schmitt trigger 25 is fed to the interrupt input 39 of the micro-controller 30. Input/output ports 41 include push button sensor 42 for a toy, LED indicators 43 and a toy motor 44 fed through transistor 45. A digital-analog converter 46 feeds an output through transistor 47 to an output speaker 48 for toy sounds. Timer A, Timer B, the 8-bit CPU 50, the clock oscillator 51 and crystal or ceramic resonator 53, the ROM 53 and RAM 54 are discussed later in detail in the description of the operation.

Figure 5:
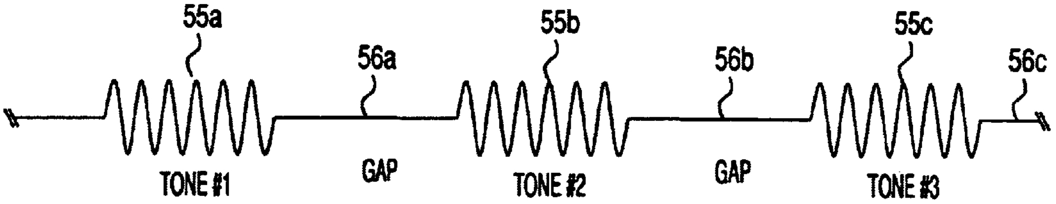
FIG. 5 is a representation of the waveform of tones transmitted by the invention.

FIG. 5 shows the waveform of tones 55*a–c* transmitted by the invention and separated by gaps 56*a–c*. The waveforms are illustrative and not drawn to scale. This representation is the same as received in an anechoic chamber.

Figure 6A:
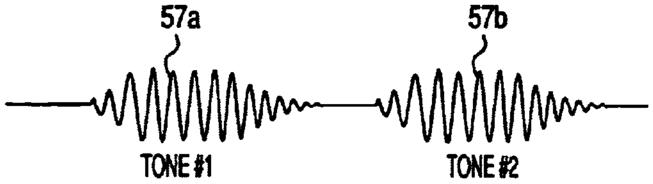

FIG. 6*a* depicts a waveform received along with a small amount of room echo or reverberation. Tone #1 is at 57*a* and tone #2 is at 57*b*.

Figure 6B:
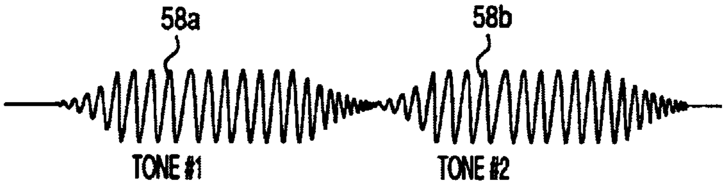

FIG. 6*b* depicts tone #1 at 58*a* and tone #2 at 58*b* received along with a considerable amount of reverberation.

Figure 7A:
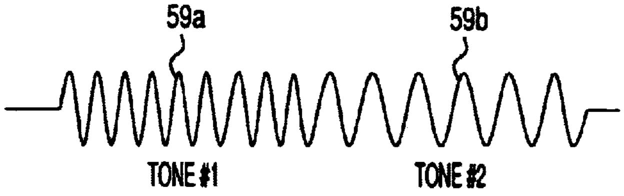

FIG. 7*a* depicts tone #1 at 59*a* and tone #2 at 59*b* with no gap may have as occurred prior to the present invention on transmission.

Figure 7B:
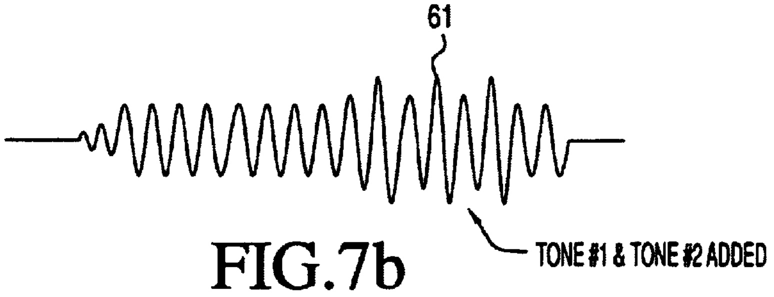

FIG. 7*b* shows a received prior art waveform 61 with tones #1 and #2 overlapping.

FIGS. 8*a*–8*c* depict details of a received waveform in a quite room with 62 representing the mic signal, 63 the output of the limiting amplifier and 64 the output of the Schmitt trigger 25.

FIG. 9*a* depicts a receiver input waveform 65 prior to the noise depicted in FIG. 9*b*.

FIG. 9*b* depicts the effect of noise on the receiver input wave 66.

FIG. 10 depicts the output wave 67 of the Schmitt trigger 25 in a noisy room with echo and ambient sounds from music or TV.

TRANSMITTER

The transmitter 10 is an electronic device, which will create the acoustic signaling sounds in its internal software or simply play back as previously created recording of the signaling sounds. The requirements of the transmitter 10 are a) it must have good enough frequency stability to create sounds that can be reliably received, and b) it must be loud enough to create a signal that can be heard by the receiver 20. These requirements will be easily met by most electronic technologies available today. Generally, the transmitter 10 is a PC or Mac computer.

The codes could also be sent from a "black-box" that is, any electronic device with a speaker 14 in it, or a heretofore unheard of device which is created specifically to send these codes. For example, the codes can be sent from computers (connected to the Internet or using special software) telephones (more likely speakerphones), televisions (broadcast or VCR/DVD), radios, Casio or other electronic musical instruments, cassette recorders, MP-3 players or other dolls and the list could go on and on to include electronic toys and noisemakers of all kinds, doorbells, telephone electronic ringers and dedicated miniature "remote control" transmitters akin to car burglar alarm controls or garage door openers.

RECEIVER

In a preferred embodiment, the receiver 20 generally comprises:

1. An electret microphone 22 of the type found in virtually all modern electronic devices (cell phones, cassette recorders)
2. A limiting amplifier 24 which has high gain and "limits" or produces a maximum output for any input signal above a minimum value. This amplifier 24 will also have a high frequency roll-off to eliminate high and ultrasonic frequencies from the amplifier 24. For example, some buildings have ultrasonic security equipment that would interfere with the limiting amplifier 24 if not filtered out. In addition, low frequencies below the frequencies presented in the codes are rolled off as well. While the effectiveness of these roll off filters is not very great, they are helpful. Because of the high gain of the limiting amplifier 24 the roll offs do not eliminate all of the unwanted frequency components. It is the job of the micro-controller 30 to perform the final analysis digitally.
3. A Schmitt trigger circuit 25 to "square up" the output of the limiting amplifier 24.

Another way of describing this action is to say that the circuit is a "zero cross detector." It will produce a square wave that is "high" if the input waveform is positive and "low" if the input waveform is negative. This Schmitt zero-cross function can be performed by an integrated circuit comparator with added positive feedback, or a discrete transistor circuit, or the micro-controller 30 mentioned below in (4.) may have a Schmitt trigger 25 circuit built into its input pin.

As A/D converters become less expensive, an A/D converter with associated input amplifier may be used in conjunction with the micro-controller 30 or digital signal processor (DSP) to provide the roll off, limiting and zero cross functions together. Or, similar to the way a PC is used in the preferred embodiment as the transmitter 10, a PC equipped with a microphone and sound card could be used as a receiver. A PC has more than enough processing power to perform the decoding, which is done in the preferred embodiment with a micro-controller 30. In this case, the doll or toy could activate the PC and cause it to do any desired thing such as go to a certain web site, or put something up on it's screen, or make a sound.

4. The receiver 20 also includes micro-controller 30 to measure the times of the zero crossings and determine, (perform the detection and decoding algorithms) what code, if any, is being listened to. Many of the functions performed by the micro-controller 30, such as a digital filtering, are exactly the same as those typically performed by a digital signal-processing chip (DSP). The only difference is that we have designed the codes and the detection algorithms so that they do not exceed the MIPS (millions of instructions per second) rating or capability of the micro-controller we are using. A DSP chip could also do the job, but as of this year, a DSP would be more expensive in this application. It should be noted that the micro-controller also performs all the other functions of the doll in our embodiment, which includes controlling the motors and generating speech, and a DSP chip might also not be as well suited to these tasks, as it might not have the large ROM memory required of the micro-controller to store the speech information. The DSP might do a better job with the algorithms, but we are already getting spectacular performance using the micro-controller. Examples of possible enhancements through the use of higher performance micro-controllers or DSPs are given in the detailed description of the detection algorithm. This invention claims a system that can work well without a DSP chip, but which will not become obsolete when DSPs move lower down the price curve.

TONE GENERATION IN TRANSMITTER

Referring now to the drawings, the invention comprises a computer 10 or similar hardware for generating a sound code in periodic bursts followed by a gap of silence. The tone generation by the transmitter or computer 10 is described in the following discussion:

The time in the invention is as follows where:

T1 will be length of the actively transmitted portion of each tone.

T2 will be the length of the gap between tones.

Therefore, T1+T2 will be the length of each tone and subsequent gap.

If a transmitted code consists of L transmitted tones, then the total code length is L*T1+(L−1)*T2.

As described, a sequence will have n tones and be transmitted m times. Of course m need not be an integer because the code may start and stop on any of its constituent tones. It is now necessary to modify the definition of n. Assume that p is the number of tones in the tone palette. And further assume that each unique code sequence of n tones may use all p tones, or it may use a subset of p, which we will call s. For simplicity's sake, each transmitted code sequence will use the same number of tones=n, although a practitioner skilled in the art may now see how different n values may be used with a given value of p.

One can also now see that the receiver 20 must be capable of detecting all p tones, regardless of n, so that it may decode whatever tone sequence it encounters.

A larger value of n, which indicates a longer sequence, has the following characteristics:

a. More possible different codes, which therefore convey more information per instance of code received. This is generally good, because it is often desired in the real world to transmit data.

b. Longer transmission time per code repetition, for a given T1 and T2. This is generally negative, because a) response time of the system will be slower, and b) the receiver 20 will be less likely to receive an unbroken portion of the sequence because noise and ambient sounds remain equally likely independent of n. It may, however, be possible to compensate for this deficiency somewhat with a more elaborate decoding scheme, which will be described the detailed section on decoding.

The so-called preferred embodiment uses an excellent tradeoff of the aforementioned characteristics to arrive at n=4, p=4 and s=2, 3 and 4. It will, after reading our examples of these values permit a skilled practitioner to generate codes for other values of n, p and/or s. For the sake of brevity, we will not list other examples here but simply mention that the receiver must be able to reliably detect all p tones. A feature of the invention is the anonymity of the codes since a subset of the available codes has the characteristic that each code in the subset, in comparison to the other codes in the subset, is unidentifiable to the average person. The beginning code is randomized and can begin on any tone of the palette and optionally the final tone can be randomized to end on any tone as long as the total duration is reached.

We also should mention the case of p>n. This will give more codes (more data transmitted per code) in the same time space as the case of p=n (or p<n for that matter). What is the potential downside of p>n or p>>n? Possible negative effects are a) increased difficulty of discriminating tones reliably due to decreased signal to noise ratio if a larger portion of the frequency spectrum is used for the larger p, which operating in a similar noise environment, b) increased complexity in the receiver, which may or may not be important depending on the state of the micro-controller or DSP complexity and memory complement available, and c) this is interrelated with (b): decreased confidence that simply receiving a seemingly valid sequence gives a high degree of likelihood that it has indeed been transmitted and is not noise.

DETAIL OF TRANSMITTED CODES

For case of p=4, the 4 tones are known as a, b, c, and d. Any similarity to musical tones A, B, C, or D would be entirely coincidental; the selection of actual frequencies for the tones is discussed later.

Note that each tone sequence, in accordance with the present invention, is chosen to be repeatable and identifiable using any n-length portion of the sequence. Tone sequences, n=4, s=4

1. abcd
2. abdc 3. acbd
4. acdb
5. adbc
6. adcb

Tone sequences, n=4, s=3

1. abac
2. abad
3. acad
4. babc
5. babd
6. bcbd
7. cacb
8. cacd
9. cbcd

Tone sequence, n=4, s=2

1. abab
2. acac
3. adad
4. bcbc
5. bdbd
6. cdcd

In summary, for p=4, n=4 and s=2, 3 and 4, the total number of codes available is 6+9+6=21.

The following list are available for p=5, n=5, s=5

1. Abcde
2. Abced
3. Abdce
4. Abdec
5. Abecd
6. Abedc
7. Acbed
8. Acbde
9. Acdbe
10. Acdeb
11. Acebd
12. Acddb
13. Adbce
14. Adbec
15. Adcbe
16. Adceb
17. Adebc
18. Adecb
19. Aebcd
20. Aebdc
21. Aecbd
22. Aecdb
23. Aedbc
24. Aedcb

ORTHOGONAL SYSTEMS

We have described in the foregoing how more codes can be available if p and/or n are increased over the examples given, and we have also described potential downsides.

We now describe an additional possibility. If we have more than one transmitter-receiver set, and if each set uses a unique palette of p tones, then the system will be orthogonally operable in the same physical space, without additional complexity in the receivers. This is analogous to operating radio transmitters on different frequencies.

In these orthogonal systems, the transmitting and receiving is all done digitally. Recall the input-limiting amplifier provides only lower-Q roll off; all of the frequency discrimination is preformed in the micro-controller code. Therefore, it is quite possible to have an input switch on the receiver, and also on the transmitter if it is not of the simple storage type, to select a "channel" of operation. In this way, if the invention is used for example as a controller for a virtual pet, it is possible to use one "channel" for dogs, and one for cats. Another way to use the channels would be to switch your pet to a secret channel so your friend cannot control it even if he/she has the same toy. In summary, the use of the orthogonal systems is a way to "cheat" the system into giving more codes for the same complexity and expense.

ALTERNATE EMBODIMENT

A. Tone followed by much lower amplitude of the same tone. For example, 20 dB followed by Tone a at 5 dB.

B. Tone followed by very high or very low pitch tone.

C. Tone whose frequency is swept either high to low or low to high during the duration of the tone, said sweep remaining within the receiver discrimination tolerance. This could help with the standing waves in some case and yet remain compatible. It could also be chosen to be used dynamically simply to add coloration to the sound, therefore increasing the acceptability to the human listener, while still working properly.

DECODING IN THE RECEIVER

The following discussion involves the steps of software decoding of code sequences in the preferred embodiment. The skilled practitioner will then see how to perform a similar procedure on any other micro-controller (as long as it had enough memory and processing power) or PC.

The micro-controller, or CPU, configures itself to be interrupted at each positive or negative (but not both) edge of the signal appearing on its Interrupt input pin. At the time of interrupt, the CPU reads a free running counter, which in the preferred embodiment is know as a timer, but which is simply a counter that increments once per clock cycle. This time is stored in RAM. Then the previously stored value is subtracted from the present one, which will give as a result, the count in clock cycles between the last two zero crossings. Additional programming code is provided to ascertain if the counter has overflowed since the last reading, because if it has, the reading would not be valid.

Now it would be desirable to do a comparison on the obtained value to determine whether the measurement corresponds to one of the valid p frequencies. However, in the preferred embodiment, we first perform an average of the last two readings. This provides an easy yet very effective way of nulling out the effect of any single-noise related error.

After the averaging process, each obtained value is compared with acceptable values for each of the p frequencies, so that the input values can be sorted into frequency bins. A rather wide tolerance is allowed on this binning, with the aim, again, of reducing the deleterious effects of ambient and other noise. It will be recognized by the astute reader, at this point, that, because we are dealing in what might be called the "zero cross-domain," that some noise can be removed by relaxing the requirements on the zero crossing. This method is extremely effective in improving the final result, when compared to the more intuitive tendency to think that you should use a tight frequency tolerance. Other decoding systems that require a tight frequency tolerance will have great difficulty in achieving any kind of acceptable performance while operating acoustically.

In fact, the tolerance is loose enough that for lowest cost to save some pennies, a ceramric resonator may be used in the micro-controller's clock circuit, even though the tolerance of the resonator is much worse than a quartz crystal.

Next, if one of the p bins is matched, then a weighted factor is added into that bin. Why a weighted factor? It is yet another feature of the present invention: the weighting is proportional to the period of the input signal or bin, and though this scaling we convert form a zero cross to an energy vs. time representation.

At this point in the decoding process it is only necessary to examine the energy in the frequency bins and determine if any valid codes are being received. This is a process that may seem rather simple, and in some sense, it is, but there are some processes that we have included in the present invention that achieve truly excellent results.

The amplitude characteristic of the tones, which consist of a tone and a silent gap, has been cited as a way of penetrating better through room echo. This is true, and yet there is an additional benefit, which is that each bin over time must have a characteristic shape in time. If a steady tone is received, this is not acceptable, and if a duration that is much too short is seen, that is also rejected.

To accomplish this shape discrimination, a history of all q bins is kept and each history convolved with a digital filter designed for the desired shape, and this output to a p-way comparison to determine if any is sufficiently dominant, that is, if it appears as if it is being received. If the decision of this process is in the affirmative for this bin, then a history of previous valid tones is examined to see if a valid n-length code is being received, and also if the timing of said code appears to be valid, at which point, if valid, an output is made to the main control logic of the micro-controller.

As an extra precaution in the preferred embodiment, n+1 valid tones are required in sequence, for an n length code. This concept can be taken further. If, for example, a certain code is intended to spray water out of the toy when it is received, then we would want to increase the noise immunity of that code above the other codes. This can be easily done by requiring that code, for example, an n+2 length sequence instead of the usual n+1. Conversely, if one of the codes did not need to be very secure, you could announce it after only an n length sequence.

To repeat, it does not matter at all which of the p tones is received first; the codes all repeat end to end and can be decoded along any portion of their length.

In summary, any or all or none of the decoding details given may be used, but in any case, one skilled in the art will find that because of the design of the codes and sequences and because the input circuit proves very effective, that satisfactory results may be achieved.

PC DECODING IMPLEMENTATION

Zero crossings are not available on a PC. Most commonly, a 16-bit value is produced by the A/D converter on the sound card at a rate of 44, 100 Hz. A skilled practitioner, using the code design and relying on the description given of the decoding process, will be able to port equivalent code to a PC. It is of a great benefit in this process that modem PCs have high speed, larger complements of memory, and parallel floating point execution, so that this decoding process can take place using only a tiny slice of the CPU pie.

Some possible decoding methods used on the PC are a) FFT to determine energy in each frequency bin and proceed past this point as in the preferred solution; b) p digital low-to-medium Q band pass filters aid RMS detectors to set the values in the bins; or c) comparing the outputs of each filter in a p-way comparison to determine if any tone is sufficiently dominant to be chosen as the presently valid tone.

If the micro-controller has enough memory and CPU power, or if a PC is used to decode (a PC will have plenty of power) then it is possible to perform a likelihood analysis of the filtered bin outputs. It will be possible for the software to compensate for a missing tone because of the inherent self-clocking and redundant nature of the codes.

Returning to the system with p=4, and n=4, the tones are designated a, b, c, and d. In the following example, an x will be shown as a placeholder if a tone is not detected, but valid tones have been received bordering it directly or close enough to give a confidence level that a tone should be present in a particular spot. This spot is labeled x.

There are many possible examples of this. For example, if the following sequence is received: abcxabxda, then the software will know that the second x is likely to be a "c" and fill it in. This method increases the risk of error; however, with sophisticated enough timing models, the risk can be reduced greatly. In other words, if the first "c" in the sequence is a very good match to the expected shape of"c" then it is a better bet that the second x is a "c".

Examples of usage of the technology other than the preferred embodiment, involve the following:

1) BROADCAST. The present invention can be included in virtually any electronic product (or added to a non-electronic product to make it electronic) thereby enabling the product to receive commands from broadcast material. Said broadcast material can be in the form of radio, television, Internet, VCR, DVD, cassette player, etc.
   a) VIRTUAL PET. The broadcast would take the shape of a pet trainer telling the pet to sit, heel, beg, etc. The acoustic codes would be easily explained to the human listener as being a special dog or pet whistle. The advantage of the present system is that no hardware is required other than the broadcast receiver and the virtual pet. There are no wires to interfere with user interactions, and as an additional benefit, there need not be any setup instruction to consumers, which could otherwise confuse them or impede their acceptance of the product.
   b) AUTOMATED EXERCISE MACHINES. The broadcast material could configure the machine for the number or repetitions it wanted the person to do of a particular exercise, or adjust the resistance, or turn on a vibration motor as needed, etc.
   c) GAME. The audio codes could be broadcast to the game electronics to configure it in certain ways, such as which player has the secret prize, or issuing a bonus, or lighting up certain indicators on the game board. The present invention makes this simple and easy for the consumer, no connectors or instructions are required.
2) INTERACTIVE. The technology could be adapted to make various products for example:
   a) VCR. VCR material could issue an acoustic code to said interactive product, which in turn could sent out an infrared signal to the VCR to cause it to pause, or fast forward, stop, or rewind, as the case may be. Note that there is no way for a VCR to do this by itself, that is, to respond to its own program material. Again, the present invention provides this function not only at a low cost, but also in a form that is simple and easy for the consumer to use. The same principle could be applied to other media such as DVD.
   b) ELECTRONIC MUSICAL INSTRUMENT. The present invention, if built into, for example, a learning keyboard instrument of the type which lights up certain keys in a follow-along mode, could actually control which keys light up, which tunes are played, or what chord may accompany what the student is playing. No adaptors or cables are required, the system would work by virtue of the fact that if the VCR or broadcast is playing loudly enough for the person to hear it, then the interactive product will also be able to hear the codes.

3) DOWNLOAD. Broadcast television could download program information regarding subject matter, start times, etc., to a product through the use of the present invention, if incorporated into a remote control unit for the TV or other media device. The pleasant sounding audio codes would also serve as a reminder to the consumer that the data has been downloaded. Said data could then be used to cause the remote control to turn on or off the TV at specific times. In another embodiment, the download could consist of information specific to a program that would enable the user to benefit from such information, or answer questions regarding the downloaded information, or receive electronic savings coupons, or answer a mystery raised in the program material, or turn on lights at a specific time or specific brightness.

While the invention has been explained by a detailed description of certain specific embodiments, it is understood that various modifications and substitutions can be made in any of them within the scope of the appended claims, which are intended also to include equivalents of such embodiments.

What is claimed is:

1. An acoustic signaling system comprising:

a transmitter for producing predetermined coded sound, the coding of said sound consisting of a continuously repeating pattern of different tones, each tone in the sequence being different in frequency from the tone immediately preceding it, and each tone consisting of a burst of that tone followed by a silence gap to permit echoes to decay, the purpose of said codes being to accurately transmit information from transmitter to receiver in a reasonably short period of time, and having the ability to successfully transmit said information to a receiver acoustically if the physical environment does or does not create reflections and echoes, and if the transmitter and receiver are, or are not, in motion relative to each other, and if the transmitter and receiver are close to or at a large distance from each other; and a receiver responsive to the coded sound bursts including a micro-controller to activate various functions determined by successful reception of at least one complete sequence of the coded sound burst.

2. An acoustic signaling system in accordance with claim 1 wherein:

the transmitter comprises a computer to produce the pleasant sounding codes.

3. An acoustic signaling system in accordance with claim 2 wherein:

the receiver comprises:

an electret microphone for receiving transmitted acoustic output signals;

a limiting amplifier, coupled to the microphone, which provides a maximum output for any input signal thereto above a minimum value;

a Schmitt trigger circuit receiving and squaring up the output of the limiting amplifier; and, a micro-controller receiving the squared output of the trigger circuit to determine what code is being transmitted and perform functions determined by the code.

4. An acoustic signaling system in accordance with claim 1 wherein:

the transmitter comprises means for producing and sending said sound codes further including a speaker.

5. A method for acoustically signaling a receiver in accordance with claim 1 comprising the steps of:

transmitting predetermined coded sound bursts interrupted by gaps;

providing a receiver for the sound bursts including a micro-controller having control logic therein;

decoding the sound bursts in the micro-controller including a) obtaining counts in clock cycles between adjacent zero crossings;

b) averaging two consecutive readings to obtain a value;

c) comparing each value with predetermined acceptable values;

d) sorting the input values into frequency bins;

e) adding a weighted factor to each matched frequency bin proportioned to the period of the bin to convert from a zero cross to an energy versus time representation, the factor being multiplied;

f) examining the energy inputs in the frequency bins to determine if any valid codes are being received; and, g) feeding an output signal to the control logic of the micro-controller if a valid code is received.

6. A method for acoustically signaling a receiver in accordance with claim 5 wherein:

the weighting to produce the weighted factor is proportional to the period of the input signal to the period of the input to the frequency bin.

7. A method for acoustically signaling a receiver in accordance with claim 5 wherein:

the examining of the energy in the frequency bins comprises:

a) maintaining a history of all frequency bins for shape discrimination;

b) convolve said history with a digital filter coefficients to produce a filtered output for the next step, one filter calculation of each bin, said coefficients resulting in the calculation of a low pass filter function with a cutoff frequency near the expected rate of change of tones in the transmitter;

c) comparing the outputs of the bin filters to determine if a tone as received is sufficiently dominant;

d) examining a history of previous valid tones to determine if a valid continuously repeating n-length code is being received and if the timing of appears to be valid; and, e) providing, if valid, an output to the control logic of the micro-controller.

8. A method for acoustically signaling a receiver in accordance with claim 7 further including the steps of:

requiring the successful reception of n+m continuously repeating tones in sequence for an n length code, m being greater than zero; to increase the noise immunity thereof wherein the n-length code is repeated for a period of time longer than the time it takes to transmit the code (n+m)/n times, and said noise immunity increasing as m increases.

9. An acoustic signaling system in accordance with claim 1 wherein:

the coded sound bursts are anonymous sounding to a human listener wherein the code may begin on any of the constituent tones and end on any of the constituent tones provided the length of the transmitted sequence is sufficient for detection.

10. An acoustic signaling system in accordance with claim 1 wherein:

the transmitter comprises user controls coupled to a microprocessor to provide a predetermined output, a digital to analog converter receiving said output, an amplifier coupled to the digital to analog converter and a speaker receiving the amplifier output to provide the desired acoustic signals.

11. An acoustic signaling system in accordance with claim 1 wherein:

the transmitter comprises a transmitter device such as a cassette player or a VCR connected to a TV for acoustic output.

12. An acoustic signaling system in accordance with claim 1 wherein:

the transmitter comprises a broadcast station and a corresponding standard receiving device such as a radio or TV, the sound output of said receiving device serving as an acoustic transmitter for the signaling purposes.

13. An acoustic signaling system in accordance with claim 1 wherein:

the receiver comprises a microphone for receiving transmitted acoustic signals and a personal computer connected thereto to receive said signals, said computer including a PC sound card, a disk for loading a program into the computer and a main CPU for receiving signals from the sound card and performing algorithms in accordance with the disk program determined by the signals.

14. An acoustic signaling system in accordance with claim 1 wherein:

the receiver comprises an electret microphone for receiving transmitted signals and a Palm Pilot™ or other computing device connected thereto, said Palm Pilot™ or other computing device including software to perform the actions necessary to implement the invention described in claim 1.

15. An acoustic signaling system in accordance with claim 1 wherein:

the coded sound bursts comprise a plurality of code subsets wherein each subset of the available codes in comparison to another subset is unidentifiable to a human listener.

16. An acoustic signaling system in accordance with claim 1 wherein:

the coded sound bursts are within the audible hearing range but are unidentifiable and anonymous to a human listener.

17. An acoustic signaling system in accordance with claim 1 wherein:

the receiver dynamically adjusts the validity and time models for the received codes based on the quality level of the data received, so that if the shape of the filtered tone bins over time does not match the preferred shape, the microcontroller can check to see if the shape of the filtered tone bins over time matches a secondary or tertiary timing model, to determine if the transmitter has switched to a slower or faster tone pulse rate, and if one of the alternate shapes is matched the microcontroller can output the corresponding data signal.

18. An acoustic signaling system in accordance with claim 1 wherein:

the sound bursts each comprise a plurality of p tones and wherein the transmitter may start a sound burst comprising a code on any of the p tones and stop each code on any one of the p tones.

19. An acoustic signaling system in accordance with claim 1 wherein:

the transmitter comprises multiple channels, each channel defined as an unique tone subset of the set of p tones.

20. An acoustic signaling system in accordance with claim 1 wherein:

the receiver comprises multiple receivers to receive the transmitted sound codes.

21. An acoustic signaling system in accordance with claim 1 wherein:

the receiver is responsive to a valid audio sound code which is received and followed within a predetermined time interval by another valid audio sound code, the two or more sound codes together may be interpreted as individual digits of a larger set of codes, the base of the larger set being determined by the number codes available in the small set.

22. An acoustic signaling system in accordance with claim 1 wherein:

selected timing parameters are provided to slow down the time in cases of extreme echo.

23. An acoustic signaling system in accordance with claim 1 wherein:

the transmitter comprises means for producing and sending coded tone sequences interrupted by gaps, said sound being generated by mechanical means, i.e. a whistle with mechanically changing tuning, combined with a mechanical cam or other mechanical arrangement to select the proper tones in the proper sequence.

24. An acoustic signaling system in accordance with claim 1 wherein:

the purpose of said codes being to accurately transmit information from transmitter to receiver in a reasonably short period of time on the order of one second or less.

25. An acoustic signaling system comprising:

a transmitter for producing predetermined coded sound, the coding of said sound consisting of a continuously repeating pattern of different tones, each tone in the sequence being different in frequency from the tone immediately preceding it, and each tone consisting of a burst of that tone followed by a silence gap to permit echoes to decay, the purpose of said codes being to accurately transmit information from transmitter to receiver in a reasonably short period of time and having the ability to successfully transmit said information to a receiver acoustically if the physical environment does or does not create reflections and echoes, and if the transmitter and receiver are, or are not, in motion relative to each other, and if the transmitter and receiver are close to or at a large distance from each other;

the transmitter comprises a computer to produce the pleasant sounding codes;

a receiver responsive to the coded sound bursts including a micro-controller to activate various functions determined by successful reception of at least one complete sequence of the coded sound burst, wherein, the receiver comprises:

an electret microphone for receiving transmitted acoustic output signals;

a limiting amplifier, coupled to the microphone, which provides a maximum output for any input signal thereto above a minimum value;

a Schmitt trigger circuit receiving and squaring up the output of the limiting amplifier; and, a micro-controller receiving the squared output of the trigger circuit to determine what code is being transmitted and perform functions determined by the code.

26. A method for acoustically signaling a receiver comprising the steps of:

transmitting predetermined coded sound bursts interrupted by gaps;

providing a receiver for the sound bursts including a micro-controller having control logic therein;

decoding the sound bursts in the micro-controller including a) obtaining counts in clock cycles between adjacent zero crossings;

b) averaging two consecutive readings to obtain a value;

c) comparing each value with predetermined acceptable values;

d) sorting the input values into frequency bins;

e) adding a weighted factor to each matched frequency bin proportioned to the period of the bin to convert from a zero cross to an energy versus time representation, the factor being multiplied;

f) examining the energy inputs in the frequency bins to determine if any valid codes are being received;

g) feeding an output signal to the control logic of the micro-controller if a valid code is received;

the examining of the energy in the frequency bins comprises:

a) maintaining a history of all frequency bins for shape discrimination;

b) convolve said history with a digital filter coefficients to produce a filtered output for the next step, one filter calculation of each bin, said coefficients resulting in the calculation of a low pass filter function with a cutoff frequency near the expected rate of change of tones in the transmitter;

c) comparing the outputs of the bin filters to determine if a tone as received is sufficiently dominant;

d) examining a history of previous valid tones to determine if a valid continuously repeating n-length code is being received and if the timing of appears to be valid;

e) providing, if valid, an output to the control logic of the micro-controller;

requiring the successful reception of n+m continuously repeating tones in sequence for an n length code, m being greater than zero; and to increase the noise immunity thereof wherein the n-length code is repeated for a period of time longer than the time it takes to transmit the code (n+m)/n times, and said noise immunity increasing as m increases.

* * * * *